Figure 1:
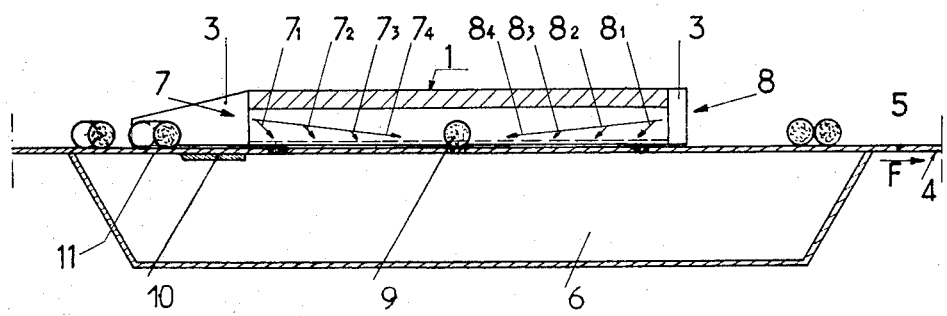

United States Patent [19]
Anfossi

[11] 3,800,936
[45] Apr. 2, 1974

[54] DEVICE FOR FORMING GROUPS OF OBJECTS MOVED ON A CONVEYOR AS A SINGLE LAYER SEQUENCE

[75] Inventor: Henri Anfossi, Orleans, France

[73] Assignee: Service D'Exploitation Industrielle Des Fabacs, Paris, France

[22] Filed: Dec. 20, 1971

[21] Appl. No.: 209,915

[30] Foreign Application Priority Data
Dec. 23, 1970 France .............................. 7046370

[52] U.S. Cl. ................................................. 198/34
[51] Int. Cl. ............................................ B65g 47/26
[58] Field of Search ............ 198/34, 20 C, 184, 203; 271/74; 302/2

[56] References Cited
UNITED STATES PATENTS
1,769,818  7/1930  Anderson ............................ 198/203

3,608,895  9/1971  Kalven ................................... 271/74
3,503,607  3/1970  Gluskin ................................. 271/74
3,568,399  3/1971  Bornfleth et al. ..................... 302/2 R
3,535,003  10/1970 Rudszinat et al. .................... 302/2 R Primary Examiner—Evon C. Blunk
Assistant Examiner—James W. Miller
Attorney, Agent, or Firm—Mark H. Sparrow

[57] ABSTRACT

A device for grouping in a specified number, objects which are moved as a single layer sequence on a conveyor unit, in particular, substantially cylindrical rod-shaped objects and, particularly cigarettes, which are moved cross-wise with respect to their axis, the latter being adapted to let air flow through it comprising at least one suction chamber associated with said conveyor unit so that said objects are subjected to that suction over at least one zone of said conveyor unit and a tunnel which extends longitudinally above said conveyor unit, is laterally air-tight and open at its ends and covers said zone of said conveyor unit.

9 Claims, 2 Drawing Figures

DEVICE FOR FORMING GROUPS OF OBJECTS MOVED ON A CONVEYOR AS A SINGLE LAYER SEQUENCE

This invention relates to a device designed to group, in a specified number, objects that are moved on a conveyor as a single layer sequence, particularly, substantially cylindrical rod-shaped objects and, in particular, cigarettes which are moved cross-wise with respect to their axis.

Devices are known, designed to group objects in a specified number, by counting objects passing on a conveyor and provided so as to isolate, from the succession of objects, those in the group whose number corresponds to the planned number. Such devices are valuable in forming production units processed as such in the sequence of operations. The devices of the above-mentioned type comprise sensing and counting means and mechanical means designed to isolate the group from the rest of the sequence.

This invention relates to an automatic device which, without any sensing or mechanical grouping means, provides for the formation of groups of objects of a specified number.

The device according to the invention is therefore designed to group, in a specified number, objects which are moved as a single layer sequence on a conveyor unit, particularly, substantially cylindrical rod-shaped objects and especially cigarettes which are moved cross-wise with respect to their axis, at least one suction chamber being associated with said conveyor unit so that said objects are subjected to that suction over at least one zone of said conveyor unit, said conveyor unit being adapted to let air flow through it, this device being characterized in that it comprises a tunnel which extends longitudinally above said conveyor unit, is laterally air-tight and open at its ends and covers, said zone of the conveyor unit.

The suction induced in the chamber generates symmetrical air currents in the tunnel in opposite directions which cause the acceleration of each object towards the median area of the tunnel where they come to rest until the arrival of the next object or objects so as to form, depending on the characteristics of the forces which are exerted on the objects in the tunnel, the group of objects of the required number whose continuous surface is subjected to suction under conditions such that the driving force of the conveyor unit overcomes the resultant of the forces derived from the air currents.

In order to avoid feeding objects into the tunnel which were positioned side by side before entering into it, means can be provided to accelerate each object in succession in a second zone preceding the zone covered by the tunnel. These means are preferably pneumatic means. Provisions may be made, for example, so that the suction chamber extends over two non-consecutive zones, the first zone, corresponding to that of the tunnel, being separated from the second, arranged upstream from the latter, by a sealing plate. Said second zone acts to hold back a second object whereas the one preceding it, having arrived onto the sealing plate, is subjected without any resistance to the accelerating air current generated in the tunnel. Thus, by this means, the objects are separated at the opening of the tunnel or are grouped therein in the required number and the group is discharged before the next object joins it.

Figure 2:
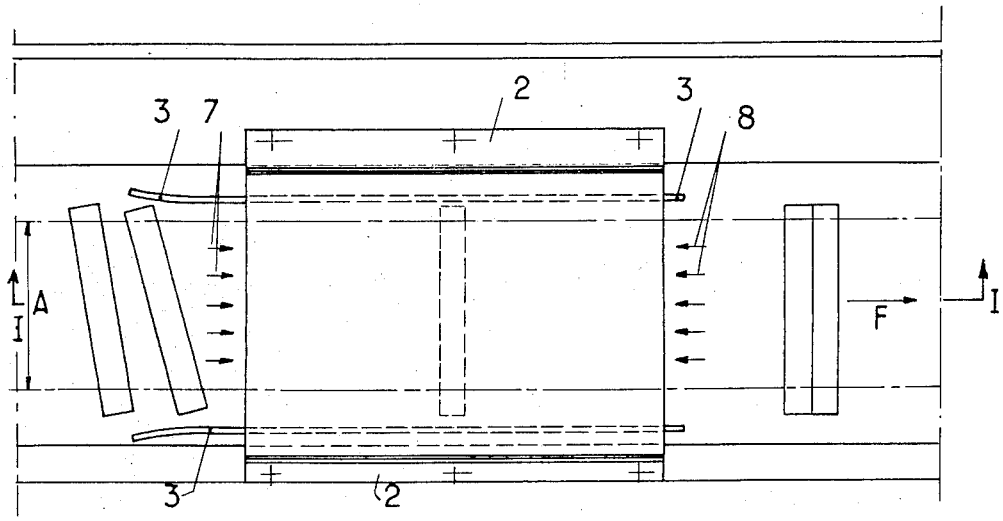

The following description, in reference to the appended drawing relates to an embodiment of the invention as applied to the conveyance of cigarettes on a perforated band, in this drawing, FIG. 1 is a longitudinal cross-sectional view along lines I—I of FIG. 2 and FIG. 2 is a plan view of the device.

The device shown comprises essentially a tunnel consisting of a cover 1 supported by two lateral panels 2. Within this tunnel, are set out two longitudinal guides 3. The perforated conveyor belt 5 feeds the cigarettes in the direction of arrow F and seals the tunnel at its base (1,2). A suction chamber 6 connected to a fan (not shown) creates a suction through the perforations of belt 5 whose internal face 4 seals the intake port of this chamber 6. This suction occurs over the entire zone corresponding to this port except in that part of sealing plate 10 which extends over the entire width of perforated zone A of belt 5.

When chamber 6 is evacuated, air penetrates in a symmetrical fashion according to arrows 7 and 8, through both ends of the tunnel. These air currents split up into secondary currents, $7_1, 7_2, \ldots 8_1, 8_2 \ldots$ whose effect decreases from the end towards the center of the tunnel. These air currents go through the perforations of belt 5 with a distribution as indicated in the drawing.

When a cigarette arrives at the opening of the tunnel, the air entering according to 7 and 8 accelerates it and then restrains it as it arrives in the central area where it comes to a stop at 9. Indeed, in this position, the isolated cigarette is subjected to the combined feeding actions of conveyor belt 5, to the thrusting action exerted by the air penetrating through 7 and to the braking action exerted by the air penetrating through 8.

Its position is that in which the resultant of these three forces is zero. It depends on the characteristics of the forces exerted in the tunnel. Conditions may therefore be provided such that the immobilization occurs in the tunnel. The feeding action of belt 5 acts over a very small surface (surface which is close to the lower generatrix of the cigarette) which makes it negligible with respect to the other two effects of the air which then maintain the cigarette in equilibrium at position 9.

When a second cigarette arrives at the opening of the tunnel, it is accelerated as well and takes up a position in which it clings to the preceding one so as to constitute a surface over which the suction effect applies with greater strength. If the action of the conveyor belt overcomes the resultant of the two other actions, the pair of cigarettes is driven by belt 5. If this continues until the outlet opening of the tunnel, the pair of cigarettes leave. If the action of the conveyor belt (because of the adjustment of the various parameters influencing the pair of cigarettes in the tunnel) does not remain predominating, the pair of cigarettes come to a stop in the downstream part of the tunnel until the arrival of a third cigarette. By adjusting the parameters, the desired groupings are formed at will.

It whould should be noted that if two cigarettes arrive side by side in zone 11, acceleration of the first will be effected to the exclusion of the second by means of plate 10. Indeed, the first cigarette, as soon as it arrives on that plate is subjected to the action of air current 7 while no longer being maintained through the suction effect, whereas the second one still remains subjected to the latter.

It should be noted that the symmetrical action of air currents 7 and 8 makes it possible to straighten the cigarettes which arrive slantwise at the opening of the tunnel, while guides 3, by aligning the cigarettes, make it possible to obtain the maximum surface by positioning them side by side.

In order to adjust the various parameters influencing the cigarettes in the tunnel, variations may be introduced, for example, as regards the degree of suction, the length, height and form of the tunnel and the distribution of the various secondary air currents 7, . . . 8, . . . In order to exert various effects, using this latter means, a perforated plate comprising suitably chosen perforations in accordance with the corresponding zone of the tunnel can, for example, be set out on the opening of the suction chamber.

The invention also applies to objects of a type different from that of cigarettes and, in particular, to objects such as packs of cigarettes, the conveyor unit being provided adequately, for example, as roller chains, the suction being then exerted between said rollers.

What I claim is:

1. A grouping device, comprising a substantially flat, horizontally extending, conveyor operable to convey a plurality of objects thereon along a path of travel, a suction chamber under a portion of the conveyor, said conveyor having means for allowing air to flow through said conveyor to said suction chamber, and an elongated tunnel over said portion of said conveyor and having open entrance and exit ends arranged transvese to the path of travel of said objects, said tunnel being in air-tight sealing relationship with the conveyor along the lateral edges of the tunnel, said suction chamber being operable to draw air into said tunnel from said entrance and exit ends such that an object on the conveyor will be subjected to a first force resulting from air entering said entrance and acting to acclerate the object along its path of travel through the tunnel, a second force resulting from air entering said exit and acting opposite to said first force and a third force resulting from the contact between the object and the conveyor acting in the same direction as said first force, said suction chamber, said conveyor and said tunnel cooperatively establishing the magnitude of said forces to cause a desired number of objects to be grouped together as they leave the tunnel.

2. A device according to claim 1, wherein the conveyor is a perforated belt.

3. A device according to claim 1 further comprising, in the upstream zone of said tunnel, means designed to accelerate each object in succession.

4. A device according to claim 3, wherein the suction chamber extends over two non consecutive zones, the first zone, corresponding to that of the tunnel, being separated from the second, set out upstream with respect to the tunnel, through a sealing plate.

5. The device according to claim 1, wherein said objects are cylindrical and rod-shaped, and the contact between the objects and the conveyor is along a line of contact.

6. The device according to claim 1, wherein said objects are cigarettes.

7. A method for grouping objects, comprising feeding said objects on a substantially flat, horizontally extending suction conveyor means along a path of travel through a longitudinally extending grouping zone, flowing air through said grouping zone in a first direction parallel to the path of travel from one end of the grouping zone toward the other end to propel said objects through the grouping zone, flowing air through said grouping zone from said other end of said grouping zone in a second direction parallel to the path of travel and opposite to said first direction to restrain the travel of the objects through said grouping zone, applying suction to said suction conveyor, and continuously moving the conveyor means through the grouping zone, the action of the suction conveyor means and the magnitude and distribution of the flow of air in said first and second directions cooperatively establishing the number of objects grouped in said grouping zone.

8. The method according to claim 7, wherein the objects are accelerated prior to the grouping zone to cause them to enter the grouping zone one at a time.

9. The method according to claim 7, wherein the objects are conveyed along said path by a suction conveyor means, and the suction is disconnected immediately upstream of said grouping zone to accelerate said objects and thereby cause them to enter the grouping zone one at a time.

* * * * *

UNITED STATES PATENT OFFICE
CERTIFICATE OF CORRECTION

Patent No. 3,800,936    Dated April 2, 1974

Inventor(s) Henri Anfossi

It is certified that error appears in the above-identified patent and that said Letters Patent are hereby corrected as shown below:

In the heading of the patent, the correct name of the assignee is: SERVICE D'EXPLOITATION INDUSTRIELLE DES TABACS ET DES ALLUMETTES Signed and sealed this 8th day of October 1974.

(SEAL)
Attest:

McCOY M. GIBSON JR.
Attesting Officer

C. MARSHALL DANN
Commissioner of Patents